United States Patent [19]

Tanizawa

[11] Patent Number: 5,535,065
[45] Date of Patent: Jul. 9, 1996

[54] RECORDING AND REPRODUCING APPARATUS HAVING MEANS FOR PERFORMING DIAGNOSTIC FUNCTIONS

[75] Inventor: Seiji Tanizawa, Kanagawa, Japan

[73] Assignee: Sony Corporation, Tokyo, Japan

[21] Appl. No.: 62,898

[22] Filed: May 14, 1993

[30] Foreign Application Priority Data

May 14, 1992 [JP] Japan ..................................... 4-122212

[51] Int. Cl.$^6$ ............................. G11B 27/36; G11B 20/18
[52] U.S. Cl. ................................................. 360/31; 360/53
[58] Field of Search .................................. 360/31, 46, 53, 360/61, 48

[56] References Cited

U.S. PATENT DOCUMENTS 4,344,094  8/1982  Ohtake et al. ......................... 360/31 X

FOREIGN PATENT DOCUMENTS

58-130415  8/1983  Japan .
0172507    7/1987  Japan .................................... 360/33.1
63-237263  10/1988 Japan .
0423290    1/1992  Japan ..................................... 360/31

*Primary Examiner*—Aristotelis M. Psito
*Assistant Examiner*—James C. Habermehl
*Attorney, Agent, or Firm*—Lise A. Rode; Robert P. Biddle; Jerry A. Miller

[57] ABSTRACT

An apparatus for recording and reproducing a signal on and from a record medium includes a reproducing system signal processing circuit (21) for reproducing a recorded information, an output circuit (25) for outputting a reproducing digital audio signal thus reproduced in the form of a predetermined format, an input circuit (29) for converting a signal input from the outside into a signal of a predetermined format and a recording system signal processing circuit (35) for recording at least an information. This apparatus includes switches (20), (23), (27) and (32) for selectively switching the recording and reproducing lines or input and output lines. Since the recording and reproducing lines or input and output lines are selectively switched, all portions that should be diagnosed can be diagnosed. Also, a circuit size can be reduced and a space factor can be improved. Hence, manufacturing cost can be reduced.

15 Claims, 5 Drawing Sheets

FIG. 4

RECORDING AND REPRODUCING APPARATUS HAVING MEANS FOR PERFORMING DIAGNOSTIC FUNCTIONS

BACKGROUND OF THE INVENTION

1. Field of the Invention

The present invention relates to an apparatus for recording and reproducing a signal on and from a record medium which is suitably applied to a digital recorder capable of carrying out self-diagnosis.

2. Background

Digital recorders that can digitally record an acoustic signal or the like are now in practical use. The Digital recorders can satisfactorily carry out a signal edit or the like because there is substantially no risk that a signal will deteriorate even when signal processing such as dubbing or the like is carried out.

In digital recorders, an encoder and a decoder that are used in digital recording and reproducing incorporate therein a CPU (central processing unit) or the like to carry out complex processing. If the processor is not functioning properly, then normal recording and reproducing cannot be carried out. In particular if the encoder function is unsatisfactory, there is then the risk that the recording is invalid. To solve this problem, professional apparatus generally have a diagnostic mechanism that detects unsatisfactory function prior to the recording or the like.

According to the conventional method of detecting a malfunction, predetermined digital data is supplied to inputs of the encoder and the decoder, for example, and output data are compared with predicted data which is separately obtained by calculation or the like. A malfunction can be detected when the output data and the predicted data are not the same. Using this method substantial time would be required to carry out an exhaustive test. Therefore, there is a limit on the kinds of data that can be checked in an acceptably short period of time.

According to another test method, the output of the encoder is supplied to the input of the decoder. An arbitrary acoustic signal is then supplied from a line input, converted from an analog to a digital signal and then supplied to the encoder. Then, the encoder's output is supplied to the decoder, and a decoded output is converted from digital to analog and output to the line output. This analog signal and the signal supplied to the line input are reproduced and compared with each other in sound by a listener. In this conventional method, however, the signal supplied to the line input cannot be immediately output to the line output because of the processing time of the encoder and decoder or the like. As a consequence, a time difference occurs and sounds of the above signals cannot be easily compared. Also, there is the risk that an malfunction cannot be detected with Sufficiently high accuracy from a hearing sense standpoint.

The assignee of the present application has previously proposed an applicable diagnostic method (see Japanese laid-open patent publication No. 58-130415). According to this previously-proposed method, random data is supplied to an encoder, an encoded output is supplied to a decoder and a decoded output is converted from digital to analog. Then, a malfunction can be detected by observing the resultant analog signal.

The signal that is provided when random data is converted from digital to analog should have a frequency spectrum of constant level over the whole frequency band which can be transmitted through that system. According to the above-mentioned method, when the encoder and/or the decoder malfunction, a fluctuation occurs in the frequency spectrum. Accordingly, such malfunction can be detected by measuring such fluctuation of the frequency spectrum.

This method, however, needs a special circuit arrangement in order to observe the frequency spectrum. Also, there is the risk that malfunction cannot be detected if the malfunction occurs randomly in the encoder and the decoder.

The assignee of the present application has further proposed a digital recorder which can accurately and easily detect a malfunction (see Japanese laid-open patent publication No. 63-237263). This digital recorder is described below with reference to FIG. 1 and FIGS. 2A, 2B.

Figure 1:
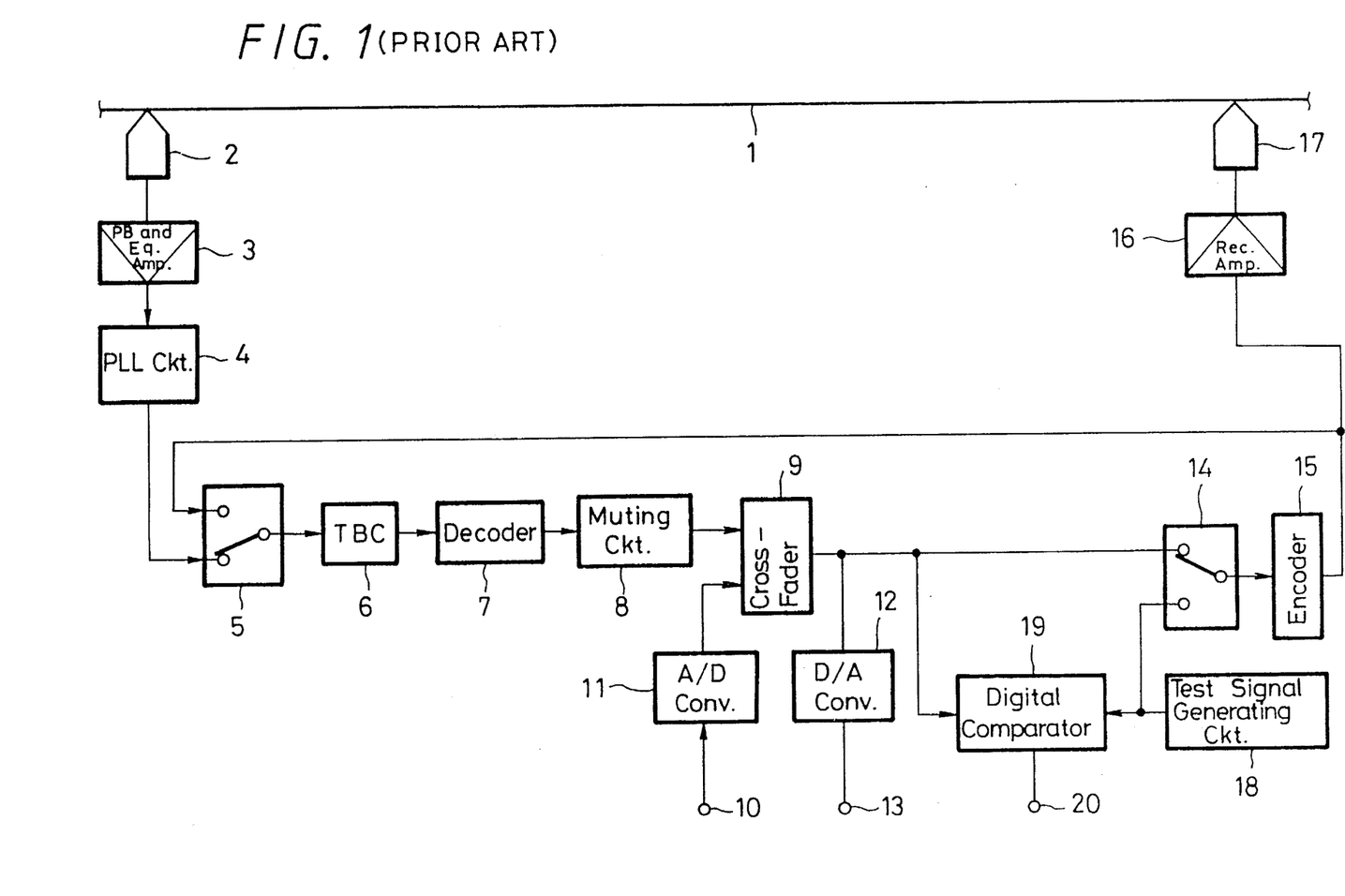
FIG. 1 is a block diagram showing a circuit arrangement of a conventional digital recorder.

Referring to FIG. 1 of the accompanying drawings, a digital signal recorded on a tape 1 is reproduced by a reproducing head 2. A reproduced signal is supplied through a playback and equalizer amplifier 3 to a PLL (phase locked loop) circuit 4 which generates a data clock as digital data. A digital signal from the PLL circuit 4 is supplied through a selector 5 and a time base corrector (TBC) 6, which is used to cancel fluctuation of a tape transport system. The output of 6 is sent to a decoder 7, where it is de-interleaved and then error-corrected.

A signal from the decoder 7 is supplied through a muting circuit 8 to a cross-fader 9, in which it is cross-faded with a digital signal that results from converting a signal applied to a terminal 10 by an analog-to-digital (A/D) converter circuit 11. A signal from the cross-fader 9 is supplied through a digital-to-analog (D/A) converter circuit 12 to an output terminal 13. The signal from the cross-fader 9 is also supplied through a selector 14 to an encoder 15, in which it is interleaved and added with an error-correction code. A signal from the encoder 15 is supplied through a recording amplifier 16 to a recording head 17, thereby being recorded on the tape 1. The digital signal recorded on the tape 1 is reproduced and developed at the output terminal 13 and the signal applied to the terminal 10 is digitally recorded on the tape 1 by the aforesaid circuit arrangement.

In the above conventional digital recorder, a signal from a test signal generating circuit 18 is supplied through the selector 14 to the encoder 15. An output signal from the encoder 15 is fed through the selector 5 back to the time base corrector 6. The signal thus fed back and which is generated from the cross-fader 9 and the test signal from the test signal generating circuit 18 are supplied to a digital signal comparing circuit 19. A compared output from the digital signal comparing circuit 19 is supplied to an output terminal 20.

The test signal generating circuit 18 generates a digital signal having a period corresponding to a total signal processing time in which the signal is input to the encoder 15, fed back and then output from the cross-fader 9. This digital signal is supplied to the selector 14 and the digital signal comparing circuit 19.

Figure 2A:
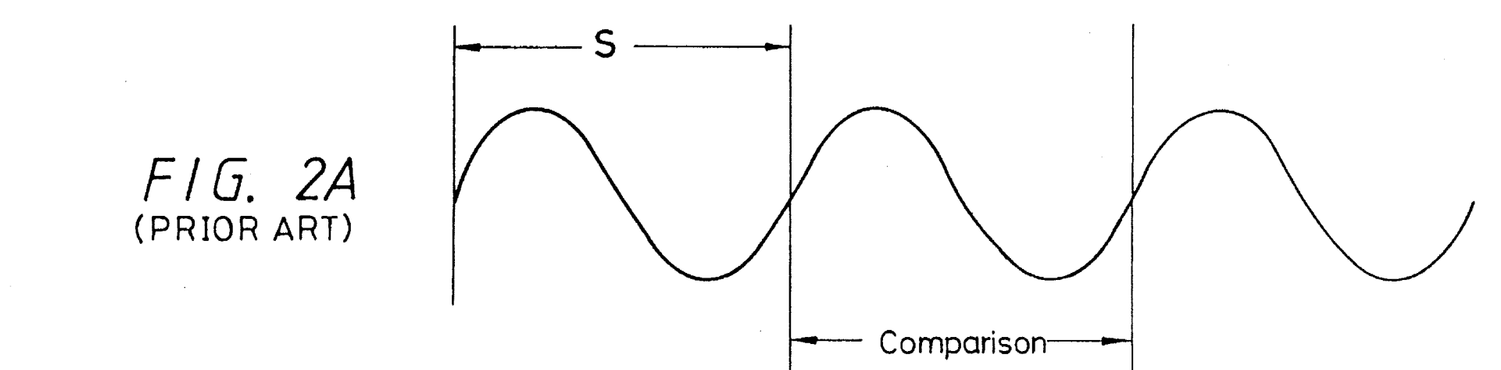
FIGS. 2A and 2B are waveform diagrams used to explain the example of the conventional digital recorder shown in FIG. 1.
Figure 2B:
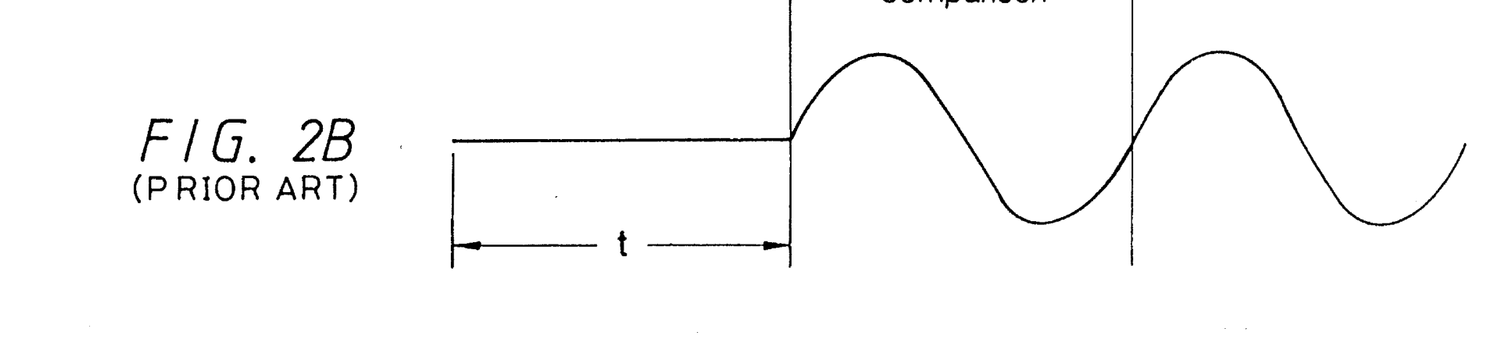

In this digital recorder, when a digital signal having a waveform corresponding to a sine waveform of a period s that is equal to a total processing time t as shown in FIG. 2A is supplied to the selector 14 from the test signal generating circuit 18, this signal is output from the cross-fader 9 after a time t as shown in FIG. 2B through the encoder 15, the decoder 7 or the like. At that time, the test signal generating circuit 18 derives exactly the same signal delayed by one period. These signals are supplied to the digital signal comparing circuit 19 which detects whether or not these signals are coincident with each other. If the encoder 15, the decoder 7 and the like are functioning properly, the cross-fader 9 should have output exactly the same signal as that supplied to the encoder 15 with a delay time of the time t. If this signal and the signal from the test signal generating circuit 18 are completely coincident with each other, then it can be determined that functions of the respective circuits are not unsatisfactory.

The function of the digital recorder is diagnosed as described above. According to the above-mentioned apparatus, the signals can be compared with accuracy by electrical comparison. Also, the signal thus encoded and decoded and the signal with the delay time of one period are compared with each other. Such comparison of the signals can be carried out very easily. Therefore, malfunction can be detected very easily and accurately.

In a digital recorder like the digital recorder in which the decoder serving as the reproducing unit and the encoder serving as the recording unit are diagnosed in function by using the test signal as earlier noted with reference to FIG. 1 and FIGS. 2A, 2B, if the period of the test signal is made equal to the processing time of the signal processing, then circuit complexity and size increases, which also makes the digital recorder expensive.

Further, in the above-mentioned digital recorder, only the function of the decoder serving as the reproducing unit and the function of the encoder serving as the recording unit can be diagnosed. Functions of other portions of the recorder cannot be diagnosed.

OBJECTS AND SUMMARY OF THE INVENTION

Therefore, it is an object of the present invention to provide an improved apparatus for recording and reproducing a signal on and from a record medium.

More specifically, it is an object of the present invention to provide an apparatus for recording and reproducing a signal on and from a record medium in which circuit size can be reduced.

It is another object of the present invention to provide an apparatus for recording and reproducing a signal on and from a record medium in which manufacturing cost can be reduced due to size reduction.

It is a further object of the present invention to provide an apparatus for recording and reproducing a signal on and from a record medium in which the apparatus can be more thoroughly diagnosed.

According to an aspect of the present invention, there is provided an apparatus for recording and reproducing a signal on and from a record medium which includes a generator for generating a predetermined signal, a recording system signal processor for processing a signal supplied thereto, and a signal supply for supplying the predetermined signal from the generator to the recording system signal processor. A recorder records an output signal from the recording system signal processor on the record medium. A reproducer reproduces a signal recorded on the record medium. A first switch is supplied with a reproduced signal reproduced by the reproducer and the output signal from the recording system signal processor and selectively outputs any of the two signals. The reproducing system signal processor is supplied with an output signal from the first switch and processes the same. An output circuit converts an output signal from the reproducing system signal processor into a signal of a predetermined format and outputs same. A second switch is supplied with a signal from the outside and the output signal from the output circuit and selectively outputs any of the two signals. An input system signal processor processes an output signal from the second switch. A third switch switches and outputs the output signal from the input system signal processor and the output signal from the reproducer system signal. A diagnosis circuit is supplied with an output signal of the third switch and the signal from the generator and diagnoses a function on the basis of these signals.

According to another aspect of the present invention, there is provided an apparatus for recording and reproducing a signal on and from a record medium which includes a generator which generates a predetermined signal. A recording system signal processor processes a signal supplied thereto. A signal supply supplies the predetermined signal from the generator to the recording system signal processor. A recorder records an output signal from the recording system signal processor on the record medium. A reproducer reproduces a signal recorded on the record medium. A first switch is supplied with a reproduced signal reproduced by the reproducer and the output signal from the recording system signal processor and selectively outputs any of the two signals. The reproducing system signal processor is supplied with an output signal from the switch and processes the same. An output circuit converts an output signal from the reproducing system signal processor into a signal of a predetermined format and outputs the same. A second switch is supplied with a signal from the outside and the output signal from the output circuit and selectively outputs any of the two signals. An input system signal processor processes an output signal from the second switch. A third switch switches and outputs the output signal from the input system signal processor and the output signal from the reproducing system signal processor and diagnosis circuit supplied with an output signal of the third switch and the signal from the generator and diagnosing a function on the basis of these signals. A delay delays the output signal from the reproducing system signal processor and supplies a delayed signal to the third switch. A display displays a compared result of the comparing circuit, wherein the supply is further supplied with the output signal of the third switch and selectively supplies the output signal of the third switch and the output signal from the generator to the recording system signal processor. The delay produced by the delay is equal to a total processing time required by the output circuit and the input system signal processor. The predetermined signal generated by the generator has a period of 1/N (N is an integer larger than 1) of a total processing time in the reproducing system signal processor and the recording system signal processor and the delay time of the delay. The diagnosis circuit includes a comparing circuit for comparing the signals supplied thereto.

According to the present invention, since the recording and reproducing lines and the input and output lines are selectively switched, a greater portion of the apparatus can be diagnosed. Also, the circuit size can be reduced. Hence, the manufacturing cost can also be reduced.

Further, according to the present invention, since the test information and the output from the reproducer output processing circuit are compared with each other to diagnose the functions of the reproducer and the recorder, the circuit size and complexity can be reduced. Hence, the manufacturing cost can also be reduced.

Furthermore, according to the present invention, since the test information and the output supplied from the reproducer output processing circuit through the cross-fader are compared with each other to diagnose the functions of the reproducer and the recorder, the circuit size can be reduced. Hence, the manufacturing cost can be further reduced.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE INVENTION

Figure 3:
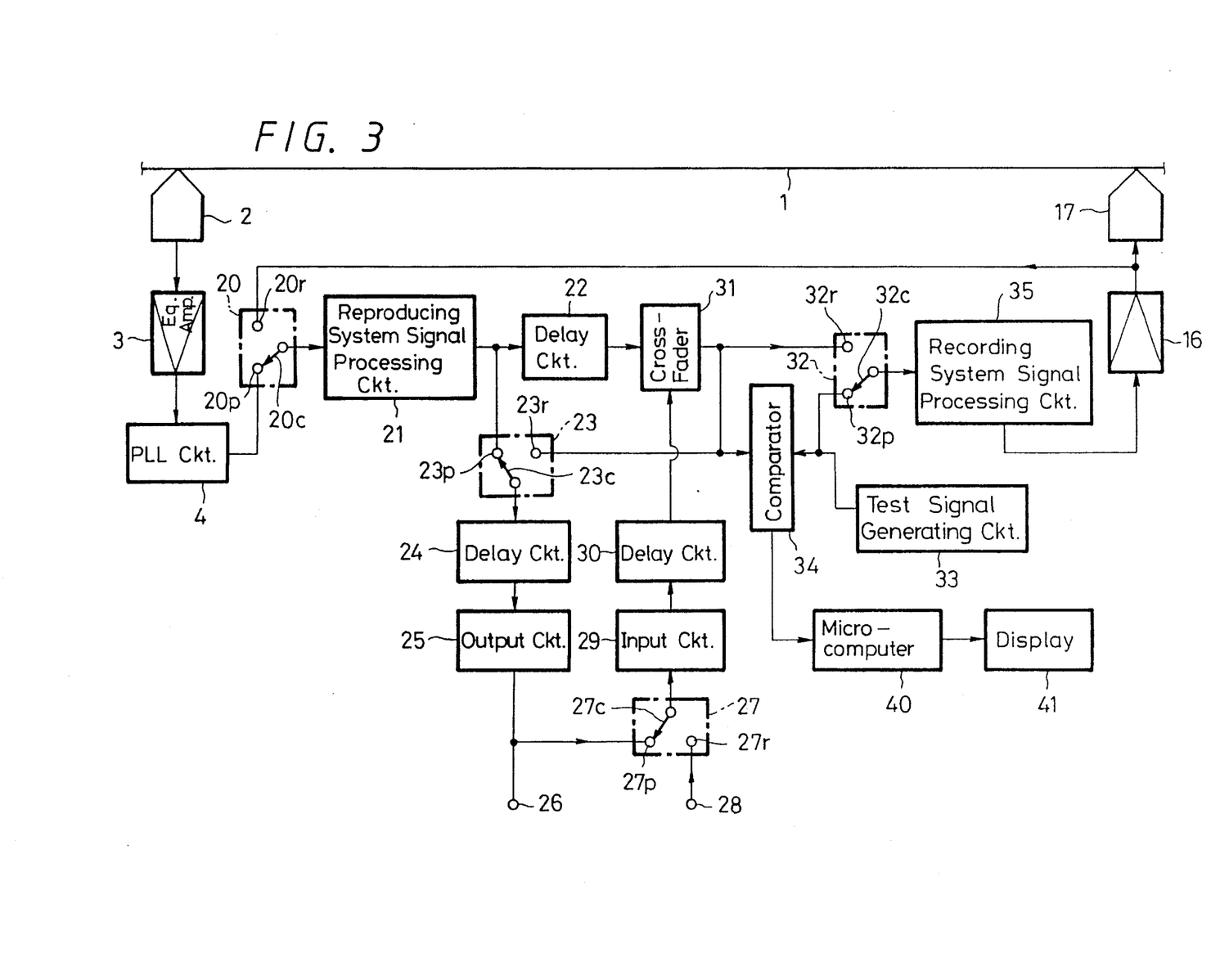
FIG. 3 is a block diagram showing a circuit arrangement of an apparatus for recording and reproducing a signal on and from a record medium according to an embodiment of the present invention.

An apparatus for recording and reproducing a signal on and from a record medium according to an embodiment of the present invention that is applied to a digital recorder will now be described in detail with reference to FIG. 3. In FIG. 3, like parts corresponding to those of FIG. 1 are marked with the same references and therefore need not be described in detail.

As shown in FIG. 3, digital audio data recorded on the tape 1 is reproduced by the reproducing head 2. Reproduced data is supplied through the equalizer amplifier 3 and the PLL circuit 4 to a fixed contact 20p of a switch 20. The switch 20 selectively connects its movable contact 20c to the fixed contact 20p or 20r in response to a switching signal that is supplied thereto from a microcomputer 40 when an input is made by a switch (not shown).

The movable contact 20c of the switch 20 is connected to a reproducing system signal processing circuit 21. The reproducing system signal processing circuit 21 processes output data (reproduced data upon playback and recorded data upon recording) from the switch 20 in a predetermined reproduced signal processing fashion. A signal processed by the reproducing system signal processing circuit 21 is delayed by a predetermined delay time by a delay circuit 22 and then supplied to a cross-fader 31.

The delay time of the delay circuit 22 is adjusted to be equal 20 to a total delay time equal to the sum of the delay times of a delay circuit 24, an output circuit 25, an input circuit 29 and a delay circuit 30.

An output from the reproducing system signal processing circuit 21 is supplied to a fixed contact 23p of a switch 23. The switch 23 selectively connects its movable contact 23c to the fixed contact 23p or 23r in response to a switching signal that is supplied thereto from the microcomputer 40 when an input is made by a switch (not shown).

The movable contact 23c of the switch 23 is connected to the delay circuit 24. The delay circuit 24 delays a signal supplied thereto through the switch 23 by a predetermined delay time. A signal thus delayed by the predetermined delay time of the delay circuit 24 is converted into a signal of a predetermined format such as AES/EBU (audio engineer society/European broadcast unit) or the like by the output circuit 25. A signal thus converted in format is supplied through an output terminal 26 to the outside and is also supplied to a fixed contact 27p of a switch 27, respectively.

The switch 27 selectively connects its movable contact 27c to the fixed contact 27p or 27r in response to a switching signal supplied thereto from the microcomputer 40 each time the input is made by a power supply switch (not shown), a switch for instructing a function diagnosis or the like. Therefore, the signal from the output circuit 25 or an input digital audio signal supplied through an input terminal 28 is selectively supplied to the input circuit 29.

The input circuit 29 converts the output signal of the switch 27 into a signal having a digital recorder format, and supplies the signal thus converted to the delay circuit 30. The delay circuit 30 delays the signal from the input circuit 29 by a predetermined delay time and supplies a signal thus delayed to a cross-fader 31. The cross-fader 31 cross-fades (switches) the signals from the delay circuits 22 and 30 and supplies a signal thus cross-faded to a comparator 34 and a fixed contact 32r of a switch 32.

The switch 32 selectively connects its movable contact 32c to a fixed contact 32p or 32r in response to a switching signal supplied thereto from the microcomputer 40 when an input is made by a switch (not shown). Thus, a signal from a test signal generating circuit 33 or the signal supplied from the cross-fader 31 is selectively supplied to a recording system signal processing circuit 35.

Figure 4:
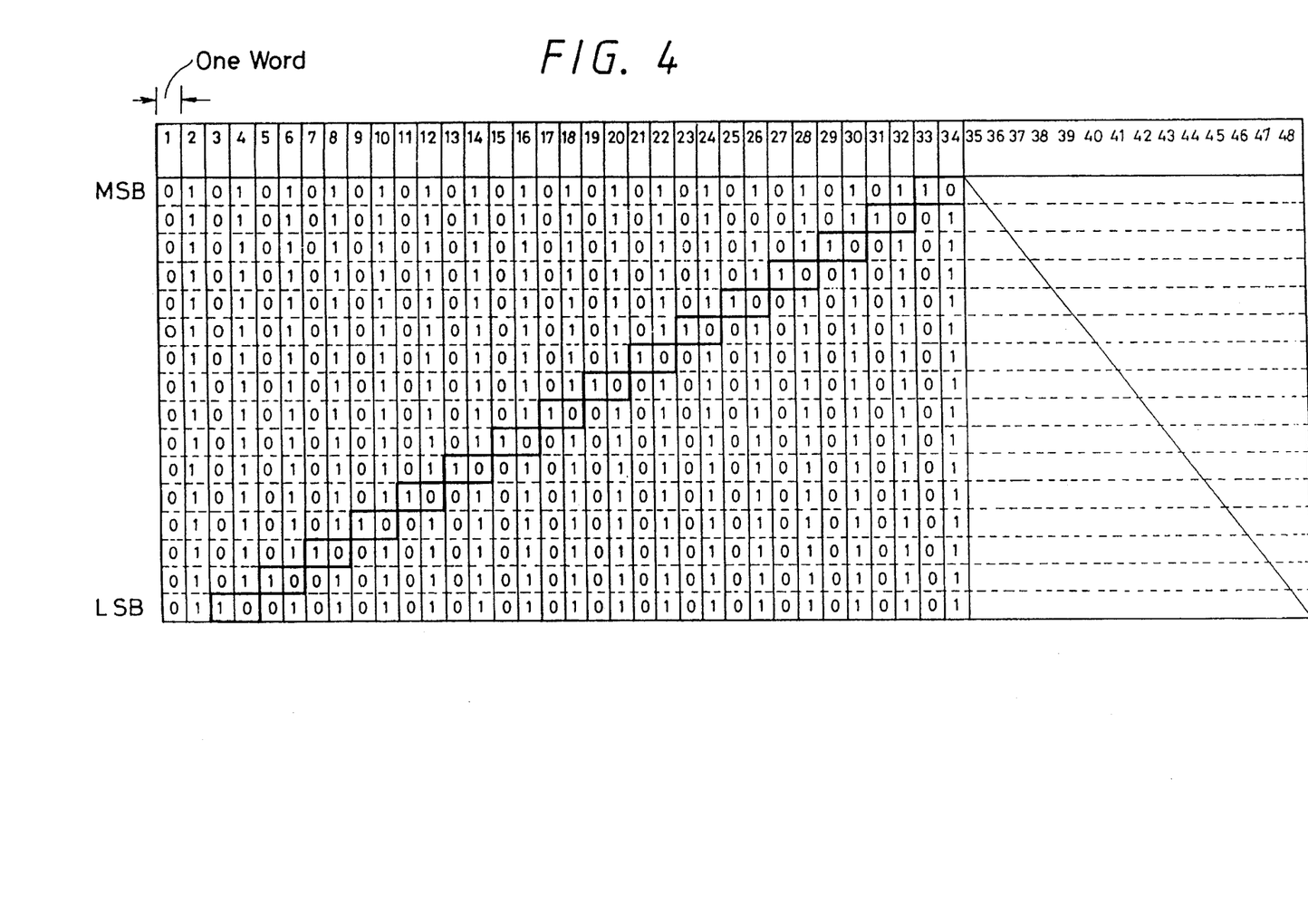
FIG. 4 is a diagram used to explain operation of the apparatus according to the embodiment of the present invention.

The test signal generating circuit 33 generates a test signal formed of 16-bit and 34-pattern (from word 1 to word 34) test signal and a dummy pattern (from word 35 to word 48 because such dummy pattern cannot be divided fully by 34 patterns) per 1 msec, as shown in FIG. 4. The test signal may be formed of an 8-bit and 24-pattern signal (1 to 24 in FIG. 4). In this case, the test signal can be fully divided and the dummy pattern is not required.

The test signal from the test signal generating circuit 33 is supplied to the comparator 34. The comparator 34 compares the test signal from the test signal generating circuit 33 and the output signal from the cross-fader 31 and supplies a compared result to the microcomputer 40.

The microcomputer 40 outputs the compared result to a display (e.g., LCD (liquid crystal display) display 41 as an image on the basis of the compared result from the comparator 34. The recording system signal processing circuit 35 processes the signal from the switch 32 in a predetermined recording signal processing fashion. A signal thus processed by the recording system signal processing circuit 35 is supplied to a recording amplifier (recording amplifying circuit) 16. The recording signal thus supplied is amplified by the recording amplifier 16 and a signal thus amplified by the recording amplifier 16 is supplied to a recording head 17 and the fixed contact 20r of the switch 20.

The recording signal supplied to the recording head 17 is recorded on the tape 1 by this recording head 17.

Operation of the digital recorder shown in FIG. 3 will be described below. Initially, a recording operation of an input signal will be described.

When the digital audio signal supplied through the input terminal 28 is recorded on the tape 1, the movable contact 27c of the switch 27 is connected to the fixed contact 27r and the movable contact 32c of the switch 32 is connected to the fixed contact 32r. The input digital audio signal is converted into a signal of a digital recorder format by the input circuit 29. The digital audio signal thus converted is delayed by the delay circuit 30 and the delayed digital audio signal is cross-faded by the cross-fader 31. The digital audio signal thus processed by the cross-fader 31 is supplied through the switch 32 to the recording system signal processing circuit 35 and is processed by this recording system signal processing circuit 35 in a predetermined fashion. The digital audio signal thus processed by the recording system signal processing circuit 35 is supplied through the recording amplifier 16 to the recording head 17 and then recorded on the tape 1 by this recording head 17.

When the input signal supplied through the input terminal 28 and the signal reproduced by the playback head 2 are cross-faded and then recorded on the tape 1, the movable contact 20c of the switch 20 is connected to the fixed contact 20p and the movable contact 23c of the switch 23 is connected to the fixed contact 23p. Simultaneously, the movable contact 27c of the switch 27 is connected to the fixed contact 27r and the movable contact 32c of the switch 32 is connected to the fixed contact 32r.

Then, the input digital audio signal is converted into a signal having a digital recorder format, for example, by the input circuit 29. The converted digital audio signal is delayed by the delay circuit 30 and the delayed digital audio signal is supplied to the cross-fader 31. The reproduced digital audio signal, which is reproduced by the reproducing head 2 and supplied through the equalizer amplifier 3, is processed by the PLL circuit 4. The reproduced digital audio signal thus processed is supplied through the switch 20 to the reproducing system signal processing circuit 21 and then processed by this reproducing system signal processing circuit 21. The reproduced digital audio signal thus processed is delayed by the delay circuit 22 and then fed to the cross-fader 31.

The reproduced digital audio signal output from the reproducing system signal processing circuit 21 is supplied through the switch 23 to the delay circuit 24 and the reproduced digital audio signal is delayed by this delay circuit 24. The delayed reproduced digital audio signal is converted into a reproduced digital audio signal of an output format (e.g., AES/EBU format) by the output circuit 25. The reproduced digital audio signal thus converted is supplied through the output terminal to an external amplifier (not shown), in which it is amplified to provide a speaker driving audio signal. Then, this audio signal is supplied to a loudspeaker (not shown) and thereby emanated from the loudspeaker as a monitor sound.

The reproduced digital audio signal from the delay circuit 22 and the input digital audio signal from the delay circuit 30 are cross-faded by the cross-fader 31. The recording signal thus cross-faded is supplied through the switch 32 to the recording system signal processing circuit 35 and processed by the recording system signal processing circuit 35 in a conventional manner. The signal thus processed by the recording system signal processing circuit 35 is supplied through the recording amplifier 16 to the recording head 17 and then recorded on the tape 1 by the recording head 17.

When the digital audio signal recorded on the tape 1 is reproduced, the reproduced digital audio signal, which is reproduced by the playback head 2 and supplied through the equalizer amplifier 3, is processed by the PLL circuit 4. The reproduced digital audio signal thus processed is supplied through the switch 20 to the reproducing system signal processing circuit 21 and processed by the reproducing system signal processing circuit 21 in a conventional manner. The reproduced digital audio signal thus processed by the reproducing system signal processing circuit 21 is supplied through the switch 23 to the delay circuit 24 and delayed by the delay circuit 24. The reproduced digital audio signal thus delayed is converted into the output reproduced digital audio signal by the output circuit 25. Then, the reproduced digital audio signal thus converted is supplied through the output terminal 26 to the external amplifier (not shown), in which it is amplified to provide the speaker driving audio signal. Then, this audio signal is supplied to the loudspeaker and thereby emanated from the loudspeaker as a monitor sound.

When the functions of the reproducing system and the recording system are diagnosed, the movable contact 20c of the switch 20 is connected to the fixed contact 20r and the movable contact 32c of the switch 32 is connected to the fixed contact 32p. Also, the cross-fader 31 is set to the reproducing side.

The test signal output from the test signal generating circuit 33 is processed by the recording system signal processing circuit 35 in a conventional manner. The test signal thus processed by the recording system signal processing circuit 35 is supplied through the switch 20 to the reproducing system signal processing circuit 21 and processed in a conventional manner by the reproducing system signal processing circuit 21. The signal thus processed by the reproducing system signal processing circuit 21 is delayed by the delay circuit 22. The delayed signal is supplied through the cross-fader 31 to the comparator 34, in which it is compared with the test signal from the test signal generating circuit 33.

When the functions of the input system and the output system are diagnosed, the movable contact 23c of the switch 23 is connected to the fixed contact 23p and the movable contact 27c of the switch 27 is connected to the fixed contact 27p, Also, the cross-fader 31 is set to the input side.

Then, the test signal output from the test signal generating circuit 33 is processed by the recording system signal processing circuit 35 in a conventional manner. The test signal thus processed by the recording system signal processing circuit 35 is supplied through the recording amplifier 16 and the switch 20 to the reproducing system signal processing circuit 21 and processed by the reproducing system signal processing circuit 21 in a conventional manner. The signal thus processed by the reproducing system signal processing circuit 21 is supplied through the switch 23 to the delay circuit 24, in which it is delayed. Then, the delayed signal is processed by the output circuit 25 and the signal thus processed by the output circuit 25 is supplied through the switch 27 to the input circuit 29 where it is processed. The signal thus processed by the input circuit 29 is delayed by the delay circuit 30, and the delayed signal is supplied through the cross-fader 31 to the comparator 34, in which it is compared with the test signal output from the test signal generating circuit 33.

Figure 5A:
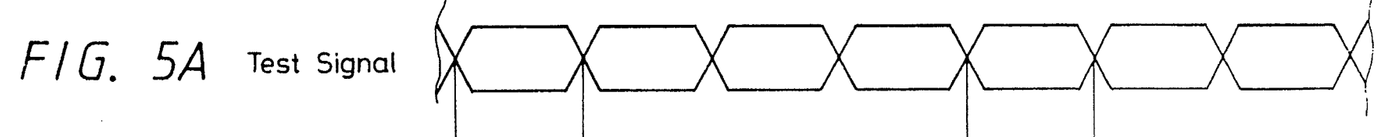
FIGS. 5A and 5B are diagrams of waveforms of a test signal and an output of a comparator, and to which references will be made in explaining operation of the apparatus according to the embodiment of the present invention.
Figure 5B:
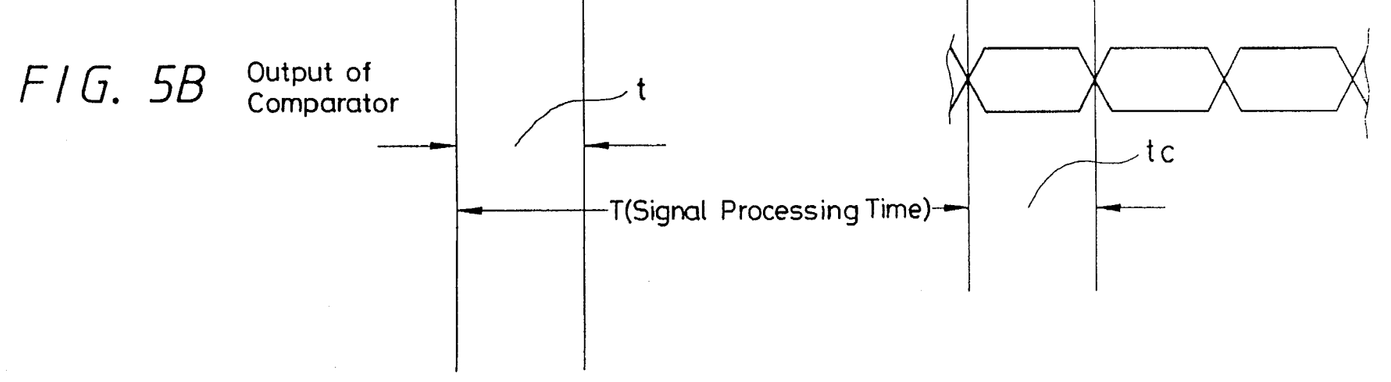

The aforesaid function diagnosis will be described with reference to FIGS. 5A and 5B. As shown in FIG. 5A, in this embodiment, the period of the test signal from the test signal generating circuit 33 is set to 1/N (N is an integer larger than 1). When the test signal output from the test signal generating circuit 33 is fed back to the comparator 34, such test signal is coincident with the test signal output from the test signal generating circuit 33. Therefore, the signal that is not processed and the processed signal can be compared with each other.

If the processing time is selected to be 122 ms, then the detection can be made by the comparator 34 at the (123 ms)'th period. Accordingly, it is proposed that the test signal having such processing time is output as it is. Such proposal brings about disadvantages from various standpoints such as the circuit arrangement or the like because the period of the test signal is too long. For this reason, the test signal having the period of 1/N of the processing time is utilized.

If the comparator 34 detects an error when the above function diagnosis is effected, then the comparator 34 transmits error information to the microcomputer 40. Then, under the control of the microcomputer 40, the display 41 displays an error message or error information representative of an abnormally function portion of the apparatus as an image in response to the transmitted error information.

According to this embodiment, when the functions of the reproducing system and recording system are diagnosed, the power supply switch is turned on or the function diagnosis switch (not shown) or the like is turned on, whereby the switches 20 and 32 are changed in position under the control of the microcomputer 40. Then, the test signal having the period 1/N of the processing time in which the dummy pattern (corresponding to 14 patterns) is added to the 16-bit 34 patterns of period of 1 msec is generated from the test signal generating circuit 33 and sequentially processed by the recording system signal processing circuit 35, the recording amplifier 16, the reproducing system signal processing circuit 21, and the delay circuit 22 and the cross-fader 31. Then, the test signal thus processed and the test signal, which is generated from the test signal generating circuit 33 and is coincident with the test signal, are compared with each other by the comparator 34. Then, on the basis of the compared result, the display 41 displays the error message and the portion of the apparatus functioning abnormally. Therefore, the circuit complexity can be reduced to the minimum and the user can know the condition of the apparatus clearly.

Furthermore, according to this embodiment, when the functions of the input system and output system are diagnosed, the power supply switch is turned on or the function diagnosis switch (not shown) or the like is turned on, whereby the switches 23 and 27 are changed in position under the control of the microcomputer 40. Then, the test signal having the period 1/N of the processing time in which the dummy pattern (corresponding to 14 patterns) is added to the 16-bit 34 patterns of period of 1 msec is generated from the test signal generating circuit 33 and sequentially processed by the recording system signal processing circuit 35, the recording amplifier 16, the reproducing system signal processing circuit 21, the delay circuit 24, the output circuit 25, the input circuit 29, the delay circuit 30 and the cross-fader 31. Then, the test signal thus processed and the test signal, which is generated from the test signal generating circuit 33 and is coincident with the test signal, are compared with each other by the comparator 34. Then, on the basis of the compared result, the display 41 displays the error message and the portion of the apparatus functioning abnormally.

Also, in accordance with this embodiment, since the input signal is selected by the cross-fader 31 as described above, a noise can be prevented from being included in the output and hence, the function diagnosis can be carried out satisfactorily.

According to this embodiment, while the delay time of the delay circuit 22 is selected to be the same as the total delay time of the delay circuit 24, the output circuit 25 and the input circuit 29, the delay circuit 30 thereby to match the phases of the signals supplied to the cross-fader 31 as described above, the delay circuit 22 is not always required. That is, when only the functions of the reproducing system and the recording system are diagnosed, the test signal generating circuit 33 is controlled such that the output signal of the reproducing system signal processing circuit 21 is supplied to the cross-fader 31 and the period of the test signal is selected by dividing the total processing time of the reproducing system signal processing circuit 21 and the recording system signal processing circuit 35 by an integer. When the functions of the input system and the output system are diagnosed, the test signal generating circuit 33 is controlled such that the period of the test signal is selected to be such one that results from dividing a total time of the processing time of the reproducing system signal processing circuit 21 and the recording system signal processing circuit 35 and the delay times produced in the input and output system circuit elements 24, 25, 29 and 30 by an integer.

According to the present invention, since the recording and reproducing lines and the input and output lines are selectively switched, all portions that should be diagnosed can be diagnosed. Also, the circuit size can be reduced. Hence, the manufacturing cost can be reduced.

Further, according to the present invention, since the test information and the output from the reproducing circuit output processing circuit are compared with each other to diagnose the functions of the reproducing circuit and the recording circuit, the circuit scale can be reduced and the space factor can be improved. Hence, the manufacturing cost can be reduced.

Furthermore, according to the present invention, since the test information and the output supplied from the reproducing circuit output processing circuit through the cross-fader are compared with each other to diagnose the functions of the reproducing circuit and the recording circuit, the circuit size can be reduced and the space factor can be improved. Hence, the manufacturing cost can be reduced.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for recording and reproducing a signal on and from a record medium comprising:

generating means for generating a predetermined test signal and supplying it to a diagnosis means for comparing said test signal with another signal;

recording system signal processing means for processing a signal supplied thereto;

supply means for supplying said predetermined signal from said generating means to said recording system signal processing means;

recording means for recording an output signal from said recording system signal processing means on said record medium;

reproducing means for reproducing a signal recorded on said record medium;

first switching means supplied with a reproduced signal reproduced by said reproducing means and said output signal from said recording system signal processing means and selectively outputting any of said two signals;

reproducing system signal processing means supplied with an output signal from said first switching means and processing the same;

output means for converting an output signal from said reproducing system signal processing means into a signal of a predetermined format and outputs the same;

second switching means for selectively switching between an externally supplied input signal and said output signal from said output means, for output to an input system signal processing means;

said input system signal processing means processes and outputs said output signal from said second switching means;

third switching means for selectively switching and outputting said output signal from said input system signal processing means or said output signal from said reproducing system signal processing means to said diagnosis means; and said diagnosis means compares said output signal of said third switching means and said test signal from said generating means to diagnose a function on the basis thereof.

2. The apparatus according to claim 1, wherein said supply means is further supplied with the output signal of said third switching means and selectively supplies any of said output signal of said third switching means and the output signal from said generating means to said recording system signal processing means.

3. The apparatus according to claim 1, further comprising delay means for delaying the output signal from said reproducing system signal processing means and supplying a delayed signal to said third switching means.

4. The apparatus according to claim 3, wherein a delay amount of said delay means is equal to a total processing time required by said output means and said input system signal processing means.

5. The apparatus according to claim 4, wherein said predetermined signal generated by said generating means has a period of 1/N (N is an integer larger than 1) of a total time of the processing times in said reproducing system signal processing means and said recording system signal processing means and the delay time of said delay means.

6. The apparatus according to claim 5, wherein said diagnosis means includes comparing means for comparing said signals supplied thereto.

7. The apparatus according to claim 6, further comprising display means for displaying a compared result of said comparing means.

8. The apparatus according to claim 1, wherein said third switching means comprises a cross-fader.

9. The apparatus according to claim 1, further comprising a micro-computer for controlling said first, second and third switching means.

10. The apparatus according to claim 9, wherein said microcomputer controls said first switching means so that said first switching means selects the output signal of said recording system signal processing means and controls said third switching means so that said third switching means selects the output signal of said reproducing system signal processing means in a first mode.

11. The apparatus according to claim 10, wherein said microcomputer controls said first switching means so that said first switching means selects the output signal of said recording system signal processing means, controls said second switching means so that said second switching means selects the output signal of said output means and controls said third switching means so that said third switching means selects the output of said input system signal processing means in a second mode.

12. The apparatus according to claim 11, wherein said generating means generates a signal having a period which results from dividing a total processing time of said recording system signal processing means, said reproducing system processing means, said input system processing means and said output means by an integer in said second mode.

13. The apparatus according to claim 10, wherein said generating means generates a signal having a period which results from dividing a total processing time of said recording system signal processing means and said reproducing system processing means by an integer in said first mode.

14. An apparatus for recording and reproducing a signal on and from a record medium comprising:

generating means for generating a predetermined test signal and supplying it to a diagnosis means for comparing said test signal with another signal;

recording system signal processing means for processing a signal supplied thereto;

supply means for supplying said predetermined signal from said generating means to said recording system signal processing means;

recording means for recording an output signal from said recording system signal processing means on said record medium;

reproducing means for reproducing a signal recorded on said record medium;

first switching means supplied with a reproduced signal reproduced by said reproducing means and said output signal from said recording system signal processing means and selectively outputting any of said two signals;

reproducing system signal processing means supplied with an output signal from said first switching means and processing the same;

output means for converting an output signal from said reproducing system signal processing means into a signal of a predetermined format and outputting the same;

second switching means for selectively switching between and externally supplied input signal and said output signal from said output means, for output to an input system signal processing means;

said input system signal processing means processes and outputs said output signal from said second switching means;

third switching means for selectively switching and outputting said output signal from said input system signal processing means or said output signal from said reproducing system signal processing means to said diagnosis means; and said diagnosis means compares said output signal of said third switching means and said test signal from said generating means to diagnose a function on the basis thereof.

(m) delay means for delaying the output signal from said reproducing system signal processing means and supplying a delayed signal to said third switching means; and (n) display means for displaying a compared result of said comparing means, wherein said supply means is further supplied with the output signal of said third switching means and selectively supplies any of said output signal of said third switching means and the output signal from said generating means to said recording system signal processing means, a delay amount of said delay means is equal to a total processing time required by said output means and said input system signal processing means, said predetermined signal generated by said generating means has a period of 1/N (N is an integer larger than 1) of a total time of the processing times in said reproducing system signal processing means and said recording system signal processing means and the delay time of said delay means, and said diagnosis means includes comparing means for comparing said signals supplied thereto.

15. An apparatus for recording and reproducing a signal on and from a record medium comprising:

test signal generator for generating and outputting a predetermined test signal to a comparator;

supply means for supplying said predetermined test signal to said input of said recording system signal processor;

recording means for recording said processed signal output from said recording system signal processor means onto said record medium;

reproducing means for reproducing a signal recorded on said record medium and outputting a reproduction signal of a first predetermined format;

reproducing system signal processing means comprising an input and an output for processing a signal input thereto and outputting a processed reproducing signal;

first switch for selectively switching between said reproduction signal and said processed signal output from said recording system signal processor for input to said reproducing system signal processing means;

output means for converting said processed reproduction signal output from said reproducing system signal processing means into a representative output signal of a second predetermined format and outputting same;

input system signal processing means for converting a signal of a second predetermined format into a signal of said first predetermined format;

second switching means for selectively switching between said representative output signal and an input record signal for input to said input system signal processing means;

a cross fader for selectively switching between the output of said input system signal processing means and the output of said reproducing system signal processor;

said comparator compares a signal input thereto with said predetermined test signal from said test signal generator;

delay means for delaying the said processed reproducing signal output by said reproducing system signal processing means and outputting to said cross fader;

said delay means provides a delay equal to a total processing time required by said output means and said input system signal processing means;

said predetermined test signal has a period of 1/N, where N is an integer larger than 1, of a total time required for processing by said reproducing system signal processing means and said recording system signal processing means; and display means for displaying the results of a comparison conducted by said comparator.

* * * * *